United States Patent
Yamada et al.

(10) Patent No.: US 7,185,117 B2
(45) Date of Patent: *Feb. 27, 2007

(54) MICROCOMPUTER AND EVALUATION DEVICE, EVALUATION METHOD THEREOF

(75) Inventors: Susumu Yamada, Gunma (JP); Tadao Nakamura, Tochigi (JP); Susumu Kubota, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 298 days.

This patent is subject to a terminal disclaimer.

(21) Appl. No.: 10/741,742

(22) Filed: Dec. 18, 2003

(65) Prior Publication Data

US 2005/0060523 A1 Mar. 17, 2005

(30) Foreign Application Priority Data

Dec. 18, 2002 (JP) .............................. 2002-366364

(51) Int. Cl.
*G06F 3/00* (2006.01)
*G06F 1/16* (2006.01)

(52) U.S. Cl. .......................................... 710/4; 708/100
(58) Field of Classification Search ................ 708/100, 708/800; 710/4

See application file for complete search history.

(56) References Cited

U.S. PATENT DOCUMENTS 5,870,541 A * 2/1999 Tamura ........................ 714/47
6,385,754 B1 * 5/2002 Mizumoto et al. .......... 714/800
6,502,210 B1 * 12/2002 Edwards ...................... 714/38

FOREIGN PATENT DOCUMENTS

JP 11-282713 10/1999

* cited by examiner

*Primary Examiner*—Kim Huynh
*Assistant Examiner*—Jasjit Vidwan
(74) *Attorney, Agent, or Firm*—SoCal IP Law Group LLP; Steven C. Sereboff

(57) ABSTRACT

Address data in an address counter is evaluated correctly. A microcomputer which outputs address data to an external device for evaluating the address data comprising an address counter specifying an address in a program memory, an address data output section which outputs, to the external device, discrimination data for discriminating whether or not the address data in the address counter is one which is branched in order for the external device to store only branched address data, the discrimination data being outputted together with the address data.

5 Claims, 3 Drawing Sheets

MICROCOMPUTER AND EVALUATION DEVICE, EVALUATION METHOD THEREOF

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

RELATED APPLICATION INFORMATION

This patent claims priority upon Japanese Patent Application No. 2002-366364 filed on Dec. 18, 2002, which is herein incorporated by reference. This patent is related to application Ser. No. 10/741,743.

BACKGROUND OF THE INVENTION

1. Field of the Invention

The present invention relates to a microcomputer and an evaluation device/method thereof.

2. Description of Related Art

A one-chip microcomputer is obtained as below. Specifically, a ROM (program memory), a RAM, a CPU and a peripheral circuit are integrated on a single semiconductor chip and this semiconductor chip is fixed on a substrate. Thereafter, an input/output port (peripheral circuit) formed on this semiconductor chip is connected to an external pin by wire bonding and the substrate having this semiconductor chip is covered with a resin member (insulating member) in a state where the external pin is exposed. Moreover, in some recent one-chip microcomputers, there is one in which, in consideration of time required for storing software in a ROM, manufacturing costs and the like, a nonvolatile memory (for example, an EEPROM) in which data can be electrically rewritten is integrated in place of a mask ROM.

In the meantime, data stored in the ROM of the one-chip microcomputer (for example, program data, table data and the like) are different according to an object to be controlled, which is controlled by the one-chip microcomputer. Thus, when the one-chip microcomputer has the above nonvolatile memory as the ROM, the data stored in the ROM are rewritten by use of data evaluated by a debugging tool (evaluation device) every time a type of the controlled body is changed.

Here, the debugging tool is a device which is connected to the one-chip microcomputer and reads in real time changes of address data in an address counter for specifying the addresses in the ROM, operation data based on program data in the ROM, and the like. Thus, the debugging tool evaluates validity of the program data. In such a manner, the data stored in the ROM can be rewritten and corrected.

Note that a technology related to the debugging tool is disclosed, for example, in Japanese Patent Application Laid-open Publication No. Hei11 (1999)-282713

However, a conventional debugging tool reads the address data in the address counter in real time and stores the entire data when the microcomputer is operated. Thus, a large-capacity volatile memory, nonvolatile memory or the like is required. Consequently, if a storage speed of the address data into the above-described memory is increased, a part of the address data may not be stored therein. Accordingly, there has been a problem that the data may not be evaluated correctly. Furthermore, there has also been a problem that the cost increases as the debugging tool grows in size.

Moreover, recently, in some of the one-chip microcomputers, an arithmetic processing speed thereof is increased to several hundred MHz. Thus, the conventional debugging tool cannot read changes of the address data, operation data and the like in real time. Consequently, there has been a problem that the data cannot be evaluated correctly.

Moreover, a package of the one-chip microcomputer, which is covered with the resin member, is miniaturized in consideration of a case where the package is built into small-sized equipments (for example, a digital camera and a portable telephone). Along with this miniaturization, a distance between the external pins is made extremely narrow. Thus, it is becoming physically impossible to read the address data, operation data, and the like by use of the conventional debugging tool. Consequently, similarly to the above case, there has been a problem that the data cannot be evaluated correctly.

SUMMARY OF THE INVENTION

One aspect of the present invention is a microcomputer which outputs address data to an external device for evaluating the address data comprising an address counter specifying an address in a program memory, and an address data output section which outputs, to the external device, discrimination data for discriminating whether or not the address data in the address counter is one which is branched in order for the external device to store only branched address data, the discrimination data being outputted together with the address data.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

Figure 1:
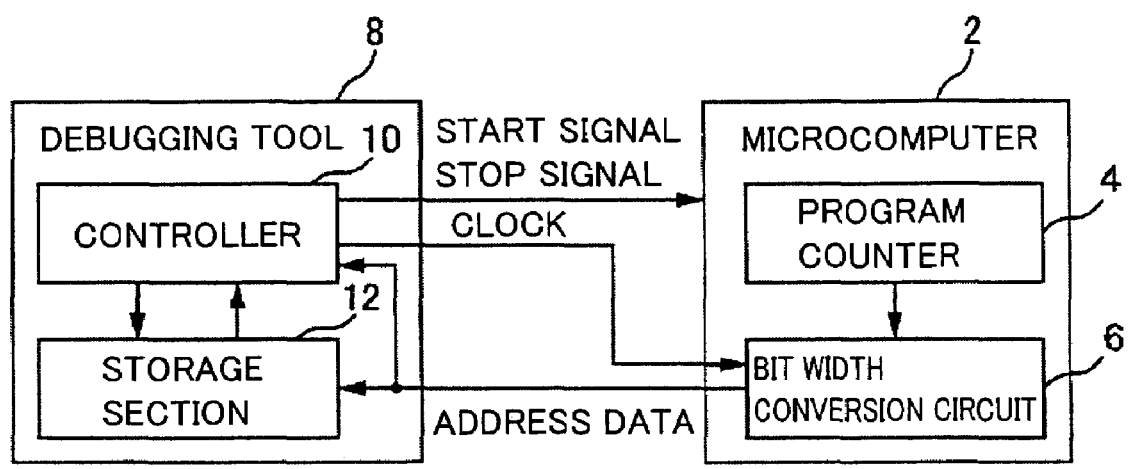
FIG. 1 is a block diagram showing schematic configurations of a microcomputer and an evaluation device thereof according to an aspect of the present invention.

At least the following matters will be made clear by the explanation in the present specification and the description of the accompanying drawings.

A microcomputer which outputs address data to an external device for evaluating the address data comprises an address counter specifying an address in a program memory, and an address data output section which outputs, to the external device, discrimination data for discriminating whether or not the address data in the address counter is one which is branched in order for the external device to store only branched address data, the discrimination data being outputted together with the address data.

According to the microcomputer described above, the discrimination data for discriminating whether or not the address data in the address counter is one which is branched is outputted to the external device together with the address data. Specifically, in the external device, since it is sufficient to store the branched address data (minimum address data), it is made possible to provide a lower-capacity memory. Consequently, even if an arithmetic processing speed of the microcomputer is increased and a storage speed of the address data into the above-described memory is increased, the external device can store necessary address data and evaluate the data correctly. Moreover, it is made possible to prevent the external device from growing in size and to prevent an increase in costs.

Moreover, in the microcomputer, the address data may have the discrimination data attached thereto.

According to the microcomputer described above, the address data integrated with the discrimination data is outputted to the external device. Thus, the external device can effectively store the branched address data and evaluate the data correctly.

Moreover, in the microcomputer, the address data output section may output the address data in the address counter to the external device while applying a unit based on a bit number smaller than that of the address data in the address counter, by use of a clock having a higher frequency which is supplied from the external device than that of a clock for operating the microcomputer.

According to the microcomputer described above, the address data can be outputted to the external device by providing a port for inputting the clock from the external device and minimum ports for outputting the address data in the address counter. For example, if the present invention is applied to a microcomputer for mass production, which has a program memory in which data can be electrically rewritten, it is made possible to obtain correct rewritten data for the program memory based on an evaluation result of the address data in the external device every time an object to be controlled is changed.

Moreover, in the microcomputer, the address data output section may output the address data in the address counter as serial data.

According to the microcomputer described above, only two ports may be provided, including the port for inputting the clock from the external device and the port for outputting the address data in the address counter.

Moreover, in the microcomputer, the address data output section may output the address data in the address counter by splitting the address data into a plurality of pieces.

According to the microcomputer described above, compared to the case where the address data in the address counter is outputted as the serial data, a frequency of the clock supplied from the external device can be lowered.

An evaluation device of a microcomputer reads address data in an address counter, which specifies an address of a program memory, from the microcomputer having the address counter. The evaluation device of a microcomputer includes an address data storage section which discriminates whether or not the address data in the address counter is one which is branched after reading the address data and stores the address data only when the address data in the address counter is one which is branched. Moreover, in the evaluation device of a microcomputer, the address data storage section inhibits storing of the address data when the address data in the address counter is one which is not branched.

According to the above-described evaluation device of a microcomputer, in the address data storage section, since it is sufficient to store the branched address data (minimum address data), a lower-capacity memory can be provided. Consequently, the address data storage section can store necessary address data and evaluate the data correctly even if an arithmetic processing speed of the microcomputer is increased and a storage speed of the address data into the above-described memory is increased. Moreover, it is also made possible to prevent the evaluation device from growing in size and to prevent an increase in costs.

Moreover, in the evaluation device of a microcomputer, the address data storage section reads, together with the address data, discrimination data for discriminating whether or not the address data is one which is branched. At the time, the discrimination data may be added to the address data.

According to the above-described evaluation device of a microcomputer, the address data integrated with the discrimination data is supplied from the microcomputer. Thus, branched address data can be effectively stored and evaluated correctly.

Moreover, in the evaluation device of a microcomputer, the address data storage section may read the address data in the address counter while applying a unit based on a bit number smaller than that of the address data in the address counter, by use of a clock having a higher frequency than that of a clock for operating the microcomputer.

According to the above-described evaluation device of a microcomputer, the device is specialized in evaluating the address data in the address counter included in the microcomputer. Thus, even if the arithmetic processing speed of the microcomputer is fast, the address data in the address counter can be read in real time and evaluated correctly. Moreover, the number of connection lines with the microcomputer is small. Thus, even if the microcomputer itself is miniaturized, the address data in the address counter can be read in real time and evaluated correctly.

Overall Configuration

With reference to FIG. 1, an overall schematic configuration according to an aspect of the present invention will be described. FIG. 1 is a block diagram showing schematic configurations of a microcomputer and an evaluation device thereof according to an aspect of the present invention. Note that the microcomputer is assumed to be a mass-produced microcomputer which has a program memory capable of electrically rewriting data.

In FIG. 1, the microcomputer 2 includes a program counter 4 (an address counter) and a bit width conversion circuit 6 (an address data output section).

The program counter 4 specifies an address of a program memory (not shown) of the microcomputer, and address data of predetermined binary values is set in the program counter 4.

The bit width conversion circuit 6 fetches the address data in the program counter 4 and attaches a header, which includes a start bit and a discrimination bit (discrimination data), to a most significant bit side of the address data. Here, the start bit is to split up a plurality of pieces of address data and is assumed to be a logical value "0". Moreover, the discrimination bit discriminates whether or not the address data in the program counter 4 is one which is branched without an increment of+1. Based on a result of decoding of program data from the program memory, the discrimination bit becomes a logical value "0" when the address data in the program counter 4 is one which is incremented by+1. On the other hand, the discrimination bit becomes a logical value "1" when the address data in the program counter 4 is one which is branched. Note that the start bit and the discrimination bit may be logical values reverse to those described above.

Furthermore, the bit width conversion circuit 6 outputs the address data having the header attached thereto while applying a unit based on a bit number smaller than that of the address data in the program counter 4. For example, the bit width conversion circuit 6 may be a parallel-serial conversion circuit. Specifically, the address data having the header attached thereto is inputted in parallel to the bit width conversion circuit 6 and this address data is serially outputted therefrom. Moreover, the bit width conversion circuit 6 may be a circuit which splits the address data (n bits) into a plurality of pieces (m: m<n), the address data having the header attached thereto. To be more specific, the address data having the header attached thereto is inputted in parallel to the bit width conversion circuit 6 and this address data is sequentially outputted in parallel therefrom while being split into m pieces of data by n/m bit. The address data obtained from this bit width conversion circuit 6 is supplied to a debugging tool for evaluating the address data, which will be described later. Note that a plurality of pieces of address data are continuously outputted from the bit width conversion circuit 6. Thus, the start bit operates effectively.

A debugging tool 8 (an external device or an evaluation device) is for evaluating the address data supplied from the bit width conversion circuit 6 of the microcomputer 2. The debugging tool 8 includes a controller 10 and a storage section 12. Note that the controller 10 and the storage section 12 constitute an address data storage section as claimed.

The controller 10 generates a clock for the bit width conversion circuit 6 to output the address data and controls write and read of the storage section 12. Values of the address data set in the program counter 4 are incremented or changed to predetermined address data in synchronization with a system clock for operating the microcomputer 2. Thus, the controller 10 supplies, to the bit width conversion circuit 6, a clock having a higher frequency than that of the system clock for operating the microcomputer 2.

As an example, it is assumed that the system clock for operating the microcomputer 2 is 1 MHz and the bit width conversion circuit 6 is a parallel-serial conversion circuit which converts 16-bit address data (note, however, that high 2 bits constitute a header) from parallel to serial. In this case, the controller 10 has to take in the address data in the program counter 4 before this address data is changed. Thus, the controller 10 supplies a 16 MHz clock to the bit width conversion circuit 6. Consequently, the bit width conversion circuit 6 outputs 16-bit address data serially in synchronization with the 16 MHz clock and while surely following the change in the address data in the program counter 4.

Moreover, as another example, it is assumed that the system clock for operating the microcomputer 2 is 1 MHz and the bit width conversion circuit 6 is a circuit which splits the 16-bit address data A15 to A0 (note, however, that A15 is a start bit and A14 is a discrimination bit) by 4 bits into A15 to A12, A11 to A8, A7 to A4 and A3 to A0. In this case, the controller 10 has to take in the address data in the program counter 4 before this address data is changed. Thus, the controller 10 supplies a 4 MHz clock to the bit width conversion circuit 6. Consequently, the bit width conversion circuit 6 outputs the address data in parallel in the order of the 4-bit data A15 to A12, A11 to A8, A7 to A4 and A3 to A0 in synchronization with the 4 MHz clock and while surely following the change in the address data in the program counter 4.

The storage section 12 stores only address data that is branched among the address data obtained from the bit width conversion circuit 6. Here, the controller 10 controls write of the storage section 12 by receiving separately the start bit and the discrimination bit among the address data obtained from the bit width conversion circuit 6. To be more specific, the controller 10 properly splits up the address data upon receipt of the start bit and discriminates whether or not the address data is one which is branched upon receipt of the discrimination bit. Thus, when the controller 10 discriminates that the address data is one which is branched, the storage section 12 sequentially stores the address data, which is obtained from the bit width conversion circuit 6 in such a manner as the example described above, in addresses specified by the controller 10. Note that, as the storage section 12, a volatile memory such as a SRAM and a DRAM, a nonvolatile memory such as an EPROM and an EEPROM, a hard disk or the like can be used. However, as the storage section 12, any memory devices other than those described above may be used as long as the memory device can surely store the address data obtained from the bit width conversion circuit 6.

Here, the controller 10 supplies, to the microcomputer 2, a start signal for starting the operation of the microcomputer 2 and a stop signal for stopping the operation of the microcomputer 2. Accordingly, the controller 10 appropriately controls an operation period of the microcomputer 2. Thus, in the controller 10, during a period when the operation of the microcomputer 2 is stopped, the branched address data so far stored in the storage section 12 is read and the data in the program memory can be continually or intermittently evaluated based on the change in the address data.

Configuration of Microcomputer

Figure 2:
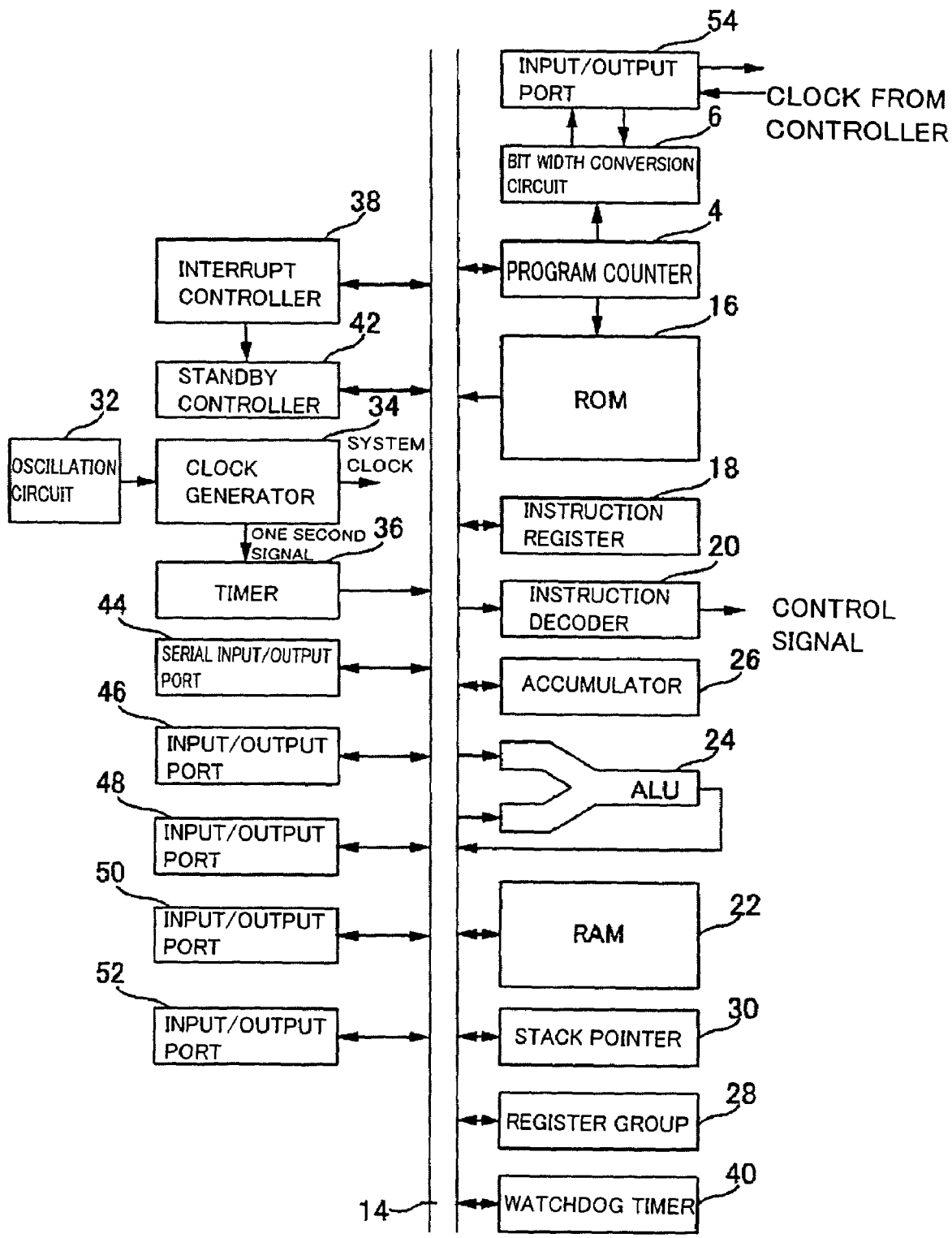
FIG. 2 is a block diagram showing internal components of the microcomputer according to an aspect of the present invention.

Next, with reference to FIG. 2, the microcomputer according to the present invention will be described. FIG. 2 is a block diagram showing internal components of the microcomputer according to an aspect of the present invention. Note that the same components as those of FIG. 1 will be denoted by the same numbers.

In FIG. 2, a plurality of internal components are connected to each other via an internal bus 14. Note that the internal bus 14 has an address bus and a data bus. However, the address bus and the data bus may be separated from each other.

First, in a ROM 16 (program memory), program data for the microcomputer 2 to appropriately execute arithmetic processing, table data referred to when the microcomputer 2 appropriately executes the arithmetic processing, and the like have been previously stored. Note that, in this embodiment, it is preferable that the ROM 16 is an EEPROM (including a flash ROM) or an EPROM, as a nonvolatile memory in which data can be rewritten. For example, the microcomputer 2 having a built-in EPROM is made available as a mass-produced product by providing therein a window section for irradiation of ultraviolet rays by removing a part of the resin member on the semiconductor chip.

The program counter 4 will be described in detail. The program counter 4 specifies an address, in which the program data or table data for executing the arithmetic processing is stored, among all addresses of the ROM 16. In the program counter 4, address data, pointing to where the program data for initializing the microcomputer 2 has been stored in the ROM 16, is preset when the microcomputer 2 is turned on. Thereafter, the address data in the program counter 4 is incremented by+1 in timing of the system clock or is branched (jumps) to predetermined address data according to a result of decoding of the program data read from the ROM 16 or an interrupt request. Thus, an address of the ROM 16 is specified by the program counter 4 and program data stored in this address or table data stored therein is read.

An instruction register 18 temporarily retains the program data read from the ROM 16 in timing of the system clock. An instruction decoder 20 decodes the program data (binary data) outputted from the instruction register 18 by use of a PLA (programmable logic array) and outputs a control signal for executing arithmetic processing.

A RAM 22 writes and reads data related to the arithmetic processing. Note that, in this embodiment, it is preferable that a volatile memory such as a SRAM, in which the data related to the arithmetic processing can be efficiently rewritten, is used as the RAM 22.

An ALU 24 (arithmetic and logic unit) includes two inputs and one output. The ALU 24 performs arithmetic processing of two input data in accordance with the result of decoding of the program data read from the ROM 16 and transfers output data obtained here to the internal bus 14. According to need, the ALU 24 supplies the output data to one of the inputs and executes the arithmetic processing again.

An accumulator 26 and a register group 28 temporarily retain data related to arithmetic processing such as the output data obtained from the ALU 24.

A stack pointer 30 retains address data in the ROM 16, the address data pointing to where a current program routine returns, when moving to a program routine different from the current program routine in accordance with predetermined interrupt processing. Note that, when the microcomputer 2 can execute multiple interrupt processing, the stack pointer 30 has the number of hierarchies corresponding to the number of the multiple interrupt processing.

An oscillation circuit 32 generates an oscillation clock to be a base of a system clock for driving the internal components of the microcomputer 2. In this embodiment, the oscillation circuit 32 is assumed to be a free-running type which generates an oscillation frequency by itself. For example, as the oscillation circuit 32, a ceramic oscillation circuit having a natural oscillator, a crystal oscillation circuit, an RC oscillation circuit and the like are applicable. Note that, instead of the oscillation circuit 32, it is also possible to supply an external clock as the oscillation clock (so to say, a made-to-run type).

A clock generator 34 splits the oscillation clock generated by the oscillation circuit 32 into a predetermined number and generates the system clock for driving the internal components of the microcomputer 2.

A timer 36 clocks a one second signal, which is obtained by splitting the oscillation clock into the predetermined number by the clock generator 34, and transfers a clocking output to the internal bus 14. Note that the timer 36 is reset and performs clocking in accordance with the control signal obtained from the instruction decoder 20.

An interrupt controller 38 generates an interrupt request for executing a program routine different from a current program routine. For example, upon receipt of a clocking change per second in the timer 36, the interrupt controller 38 generates a timer interrupt request. In this event, the ALU 24 executes only arithmetic processing of increments, carries and the like of date, hour, minute and second of a clock, for example, in accordance with the result of decoding of the program data read from the ROM 16. Moreover, the interrupt controller 38 generates an external interrupt request when a predetermined external signal is supplied to an interrupt input terminal (not shown) of the microcomputer 2. In this event, the ALU 24 executes only arithmetic processing requested by the external signal, in accordance with the result of decoding of the program data read from the ROM 16. Moreover, when a signal indicating abnormality of the microcomputer 2 is supplied from a watch dog timer 40, the interrupt controller 38 controls a standby controller 42 and stops the current arithmetic processing to set a standby mode. Note that the interrupt request is not limited to the one described above. For example, it is also possible to generate an interrupt request when an arithmetic result of the ALU 24 becomes a predetermined value.

A serial input/output port 44 and input/output ports 46, 48, 50 and 52 serve as an interface between the microcomputer 2 and the external device (in this embodiment, the debugging tool 8). The input/output ports are connected to the internal bus 14 on one ends thereof and are connected to external pins (not shown) on the other ends thereof.

An input/output port 54 serves as an interface between the microcomputer 2 and the debugging tool 8. The input/output port 54 is connected to an external pin (not shown) on one end thereof and is connected to clock input and data output of the bit width conversion circuit 6 on the other end thereof. Specifically, a clock for the bit width conversion circuit 6 to output address data is inputted to the bit width conversion circuit 6 via the input/output port 54 from the controller 10.

Operations of Microcomputer and Debugging Tool

Figure 3:
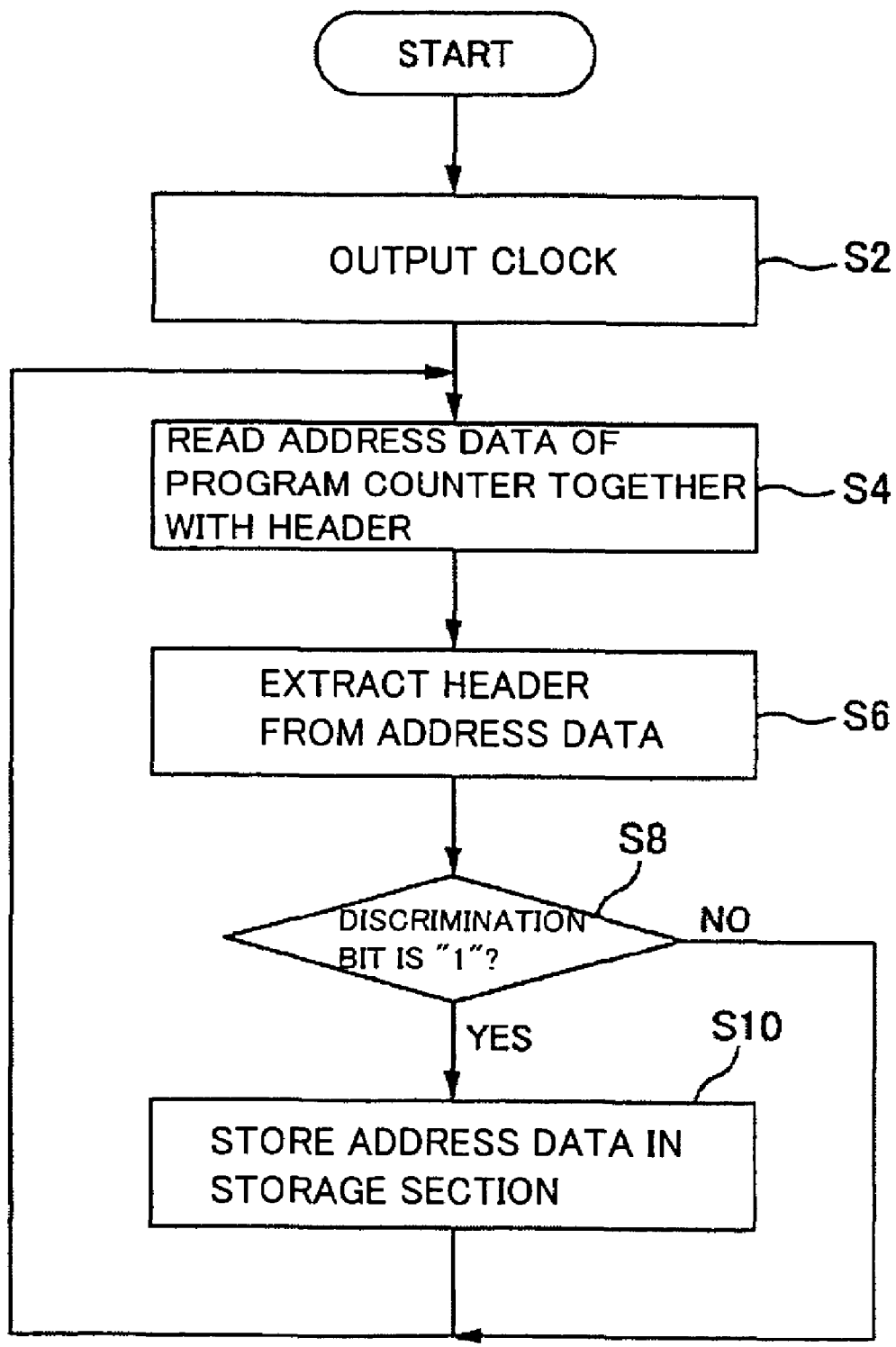
FIG. 3 is a flowchart for explaining a discrimination operation in the evaluation device of the microcomputer according to an aspect of the present invention.

Next, with reference to FIG. 3, operations of the microcomputer 2 and the debugging tool 8 will be described. FIG. 3 is a flowchart for explaining a discrimination operation of the evaluation device (the debugging tool 8) according to an aspect of the present invention.

First, the controller 10 of the debugging tool 8 outputs a start signal for starting the operation of the microcomputer 2 and a stop signal for stopping the operation of the microcomputer 2 and supplies the signals to the interrupt input terminal of the microcomputer 2. Thus, upon receipt of an external interrupt request corresponding to these start signal and stop signal, the microcomputer 2 decodes the program data in the ROM 16 and performs the arithmetic processing. At the same time, the microcomputer 2 moves to a standby mode for outputting address data in the program counter 4 at the time to the debugging tool 8.

Thereafter, the controller 10 of the debugging tool 8 outputs a clock having a higher frequency than that of a system clock for operating the microcomputer and supplies the clock to the input/output port 54 of the microcomputer 2. Note that a relationship between the frequency of the system clock of the microcomputer and the frequency of the above-described clock is as described above (S2).

Accordingly, the microcomputer 2 performs the arithmetic processing by decoding the program data in the ROM 16 and outputs the address data in the program counter 4 at the time to the debugging tool 8 together with a header. For example, when the bit width conversion circuit 6 is a parallel-serial conversion circuit, address data having a header attached thereto is outputted serially to the debugging tool 8 via the input/output port 54 from the bit width conversion circuit 6. Moreover, when the bit width conversion circuit 6 is a circuit which splits address data into a plurality of pieces, address data having a header attached thereto is sequentially outputted in parallel via the input/output port 54 from the bit width conversion circuit 6 after being split into a plurality of pieces. Note that the input/output port 54 as many as the number of bits, which enables input of clocks and output of address data (when the address data is split into a plurality of pieces, the number of bits of the respective data after division), may be previously provided (S4).

The controller 10 of the debugging tool 8 extracts the header from the address data and properly separates the address data based on a start bit. At the same time, the controller 10 discriminates whether or not the address data is one which is branched, based on a logical value of a discrimination bit (S6).

When the controller 10 of the debugging tool 8 discriminates the discrimination bit to be a logical value "1" (S8: YES), the address data is discriminated as one which is branched. Thus, the controller 10 stores the address data in a specified address of the storage section 12 and executes the processing from Step S4 again (S10).

Meanwhile, when the controller 10 of the debugging tool 8 discriminates the discrimination bit to be a logical value "0" (S8: NO), the address data is discriminated as one which is obtained by incrementing previous address data by+1. Thus, the controller 10 executes the processing from Step S4 again without storing the address data in the storage section 12. Specifically, address data that is one which is not branched is merely incremented by +1 and does not generate any irregular change. Thus, it is not necessary to store such address data in the storage section 12.

Thereafter, the microcomputer 2 stops its operation in appropriate timing according to the supplied stop signal. Thus, the controller 10 of the debugging tool 8 stops output of clocks since no address data is supplied. Consequently, a series of operations are completed.

In such a manner, only branched address data among the address data in the program counter 4 is sequentially stored in the storage section 12 of the debugging tool 8. The debugging tool 8 is specialized in evaluating the address data in the program counter 4. Thus, even if the arithmetic processing speed of the microcomputer 2 is fast, it is possible to evaluate the address data in the program counter 4 correctly. Moreover, between the microcomputer 2 and the debugging tool 8, only connection lines for the start signal, the stop signal, the clocks and the address data may be provided. Thus, even if the microcomputer 2 itself is miniaturized, it is possible to evaluate the address data in the program counter 4 correctly.

Other Embodiments

The microcomputer and the evaluation device thereof according to the present invention have been described above. However, the above-described embodiment of the present invention is for facilitating understanding of the present invention and the present invention is not limited thereto. It is needless to say that changes and alterations can be made without departing from spirit of the present invention and equivalents are included in the present invention.

Discrimination Bit

Although the discrimination bit is the header of the address data in this embodiment, the discrimination bit is not limited thereto. For example, the discrimination bit may be outputted from the microcomputer 2 to the debugging tool 8 by use of an independent line from that for the address data. Thus, it is possible to omit processing of extracting the discrimination bit from the address data in the controller 10 of the debugging tool 8.

Address Data

In this embodiment, the start bit is attached to the most significant bit of each address data in order to determine separation of address data into a plurality of pieces. However, the address data is not limited thereto. For example, the discrimination bit similar to the start bit may be attached to a predetermined position of the least significant bit or an intermediate bit of each address data.

Microcomputer

In this embodiment, the microcomputer 2 is a mass-produced product having a program memory in which data can be electrically rewritten. However, the microcomputer 2 is not limited thereto. For example, the microcomputer 2 may be a microcomputer for evaluation, which is used before mass-producing a microcomputer having a mask ROM, a one time EPROM or the like.

According to the present invention, in the evaluation device, since it is sufficient to store minimum address data each of which is branched one, a lower-capacity memory can be provided. Accordingly, even if the arithmetic processing speed of the microcomputer is increased and the storage speed of the address data into the memory is increased, the evaluation device can store necessary address data and evaluate the data correctly. Moreover, it is also possible to prevent the evaluation device from growing in size and to prevent the increase in costs.

Although the preferred embodiments of the present invention have been described in detail, it should be understood that various changes, substitutions and alterations can be made therein without departing from spirit and scope of the inventions as defined by the appended claims.

What is claimed is:

1. A microcomputer which outputs address data to an external device comprising:
   a program memory storing program data for executing arithmetic processing;
   an address counter in which address data in the program memory is set; and
   an address data output section for
      attaching discrimination data to the address data from the address counter, the discrimination data indicating whether or not the respective address data is branched
      splitting the address data and the discrimination data into a plurality of pieces of data, each of the pieces having a bit width smaller than a bit width of the address data, and
      outputting sequentially each of the plurality of pieces of data in parallel to the external device in synchronization with a clock having a higher frequency than a clock for operating the microcomputer
   whereby the external device, in response to the discrimination data, can store the address data when the address data is branched.

2. A device for evaluating a microcomputer, the device comprising:
   a controller for:
      producing discrimination data indicative of whether or not respective address data is branched, wherein the address data corresponds to address in a program memory storing program data for executing arithmetic processing, and
      controlling output of a plurality of pieces of data to the external device sequentially in parallel in synchronization with a clock having a higher frequency than a clock for operating the microcomputer, wherein each of the plurality of pieces of data is a portion of the address data and the discrimination data, each of the plurality of data having a bit width smaller than a bit width of the address data;

an address data storage section which stores the address data on the basis of discrimination result by the controller, indicating that the address data is branched.

3. The evaluation device of a microcomputer according to claim 2, wherein the address data storage section inhibits storing of the address data on the basis of discrimination result by the controller, indicating that the address data is one which is not branched.

4. The evaluation device of a microcomputer according to claim 2, wherein the controller receives separately the discrimination data among the address data attached therewith.

5. A method of evaluating a microcomputer comprising:

reading by a microcomputer address data from an address counter specifying an address of a program memory storing program data for executing arithmetic processing;

attaching by the microcomputer a discrimination data to the address data indicating whether or not the address data is branched;

splitting by the microcomputer the address data and the discrimination data into a plurality of pieces of data, each of the pieces of data having a bit width smaller than a bit width of the address data;

outputting by the microcomputer a plurality of pieces of data obtained by splitting the address data and the discrimination data sequentially in parallel in synchronization with a clock having a higher frequency than a clock for operating the microcomputer;

inputting by an external device the plurality of pieces of data sequentially in parallel;

discriminating by the external device the discrimination data; and storing by the external device the address data in a storage section when the address data is branched.

* * * * *